United States Patent
Peet et al.

(10) Patent No.: US 7,090,402 B2
(45) Date of Patent: Aug. 15, 2006

(54) THRUST BEARING

(75) Inventors: Stephen Alan Peet, Lincoln (GB); Paul Raymond Smith, Lincoln (GB); Tobias Martin Huelsen, Langen (DE)

(73) Assignee: Minebea Co. Ltd, (JP)

( * ) Notice: Subject to any disclaimer, the term of this patent is extended or adjusted under 35 U.S.C. 154(b) by 94 days.

(21) Appl. No.: 10/485,942

(22) PCT Filed: Sep. 12, 2002

(86) PCT No.: PCT/GB02/04157

§ 371 (c)(1),
(2), (4) Date: Jun. 21, 2004

(87) PCT Pub. No.: WO03/029065

PCT Pub. Date: Apr. 10, 2003

(65) Prior Publication Data

US 2004/0240760 A1   Dec. 2, 2004

(30) Foreign Application Priority Data

Sep. 28, 2001   (GB) ................................ 0123463.2

(51) Int. Cl.
*F16C 17/10* (2006.01)

(52) U.S. Cl. ...................................... 384/193; 384/245
(58) Field of Classification Search ................ 384/192, 384/193, 245, 424, 427
See application file for complete search history.

(56) References Cited

FOREIGN PATENT DOCUMENTS

| DE | 5399 | 10/1952 |
|---|---|---|
| DE | 3419776 A1 | 3/1985 |
| EP | 0559635 B1 | 9/1993 |
| GB | 2165808 A | 4/1986 |

OTHER PUBLICATIONS

Annex 1, Opposition Grounds (English translation) in Related EP application No. 02758597.5, 11 pages, explaining the relevance of the prior art documents listed on p. 1 of this statement.

*Primary Examiner*—Lenard A. Footland
(74) *Attorney, Agent, or Firm*—Ipsolon LLP

(57) ABSTRACT

A thrust bearing and method of assembling a thrust bearing, the bearing comprising: an outer housing having a substantially circular base, wherein a cylindrical side wall and a central post are upstanding from the base; an outer ball seated on and at least partially within the outer housing; and an inner ball mounted on the central post, wherein the outer ball is sandwiched between the inner ball and the outer housing.

18 Claims, 2 Drawing Sheets

THRUST BEARING

This invention relates to a thrust bearing and more particularly to a thrust bearing for use as a tram and light rail coupling bearing.

Figure 1:
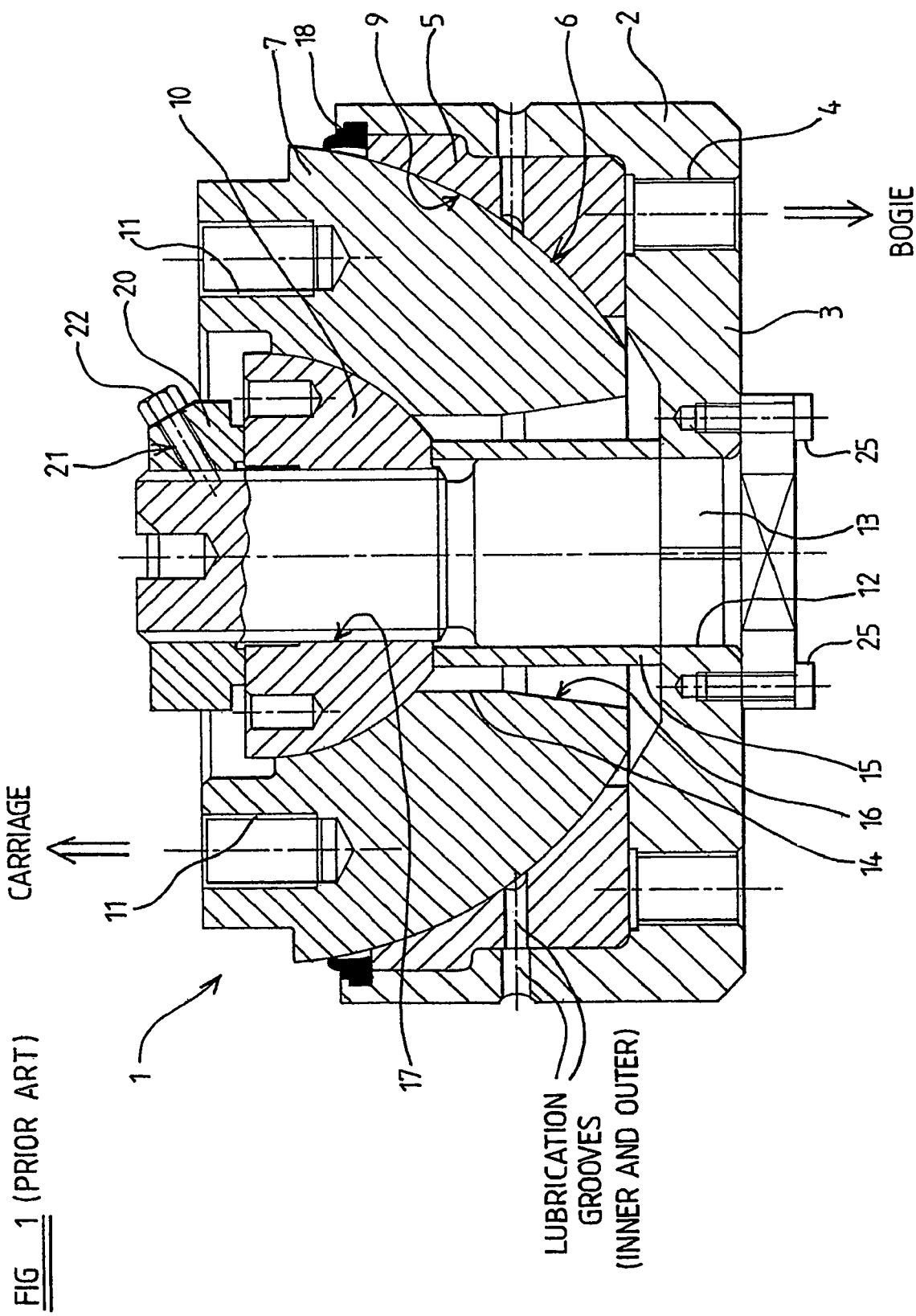

A conventional design for a thrust bearing (coupling bearing) for use in the coupling between a carriage and a bogie of a tram or similar light rail vehicle is shown in FIG. 1 of the accompanying drawings. One part of the bearing is fixed to the carriage and the other part of the bearing is fixed to the bogie under the carriage allowing the bogie to rotate and pivot with respect to the carriage. This style of coupling bearing 1 comprises a generally cylindrical outer housing 2 having a circular base 3 provided with fixtures such as mounting holes equispaced around the circular base 3 for attaching the outer housing 2 to the bogie. In the example shown in FIG. 1, there are eight mounting holes 4 equispaced around the periphery circular base 3. The outer housing 2 is preferably manufactured from alloy steel.

A spherical insert 5 is fixed to the inside wall of the outer housing 2 and also rests upon the circular base 3. The spherical insert 5 has a load bearing surface in the form of a spherical bearing surface. Lubrication grooves are provided through the outer housing 2 and the spherical insert 5 to lubricate the load bearing surface 6. The spherical insert 5 is manufactured from an engineering plastic based on Nylon, PETP, PE or PP.

An outer ball 7 is seated on the spherical insert 5, an outer spherical bearing surface of the outer ball 7 having the same radius as the load bearing surface of the spherical insert 5. The outer ball 7 is rotatably mounted on the spherical insert 5 and can also accommodate rolling and pitching movement with respect to the outer housing 2. The outer ball 7 has an inner spherical bearing surface 9. The outer ball is preferably manufactured from a corrosion resisting steel. An annular elastomeric seal 18 is attached to the top of the cylindrical side wall of the outer housing and makes sealing contract with the outer bearing surface of the outer ball.

An inner ball 10 having a spherical outer bearing surface is seated within the outer ball 7 on the inner bearing surface 9 of the outer ball, thereby sandwiching (but not contacting) the outer ball 7 between the inner ball 10 and the spherical insert 5. The radius of the outer bearing surface of the inner ball 10 corresponds to the radius of the inner bearing surface of the outer ball 7.

The outer ball 7 is provided with eight fixing holes which are equispaced around a rim of the outer ball 7. The fixing holes 11 are provided to allow the outer ball 7 to be fixedly attached to the carriage of a tram or similar vehicle.

The circular base 3 is provided with a central hole 12 which receives a through-bolt 13. The outer ball is also provided with a central aperture 14 so that the bolt 13 passes readily therethrough. Indeed, the central hole 14 of the outer ball 7 is spaced apart from the bolt 13 and an inner sleeve 15 which surrounds the bolt 13 in a slide-fit engagement by a clearance distance, which clearance distance allows the outer ball 7 to roll and pitch with respect to the outer housing 2.

Preferably, the central hole 14 through the outer ball 7 has a contact surface 16 which can engage an outer surface of the inner sleeve 15, thereby acting as an end stop.

Preferably, the inner sleeve is manufactured as a cold drawn seamless steel tube. The inner sleeve also acts as a spacer separating the inner ball 10 from the circular base 3 of the outer housing by a pre-determined distance, that distance being substantially equal to the separation distance between the inner ball 10 and the spherical insert 5.

The bolt 13 also passes through a central hole 17 in the inner ball 10 with a slide fit engagement, the end of the bolt protruding past the inner ball 10. A nut 20 is screwed onto the bolt 13. The nut 20 is provided with a threaded hole 21 which receives a grub screw 22. The grub screw 22 can be tightened down onto the bolt 13 thereby locking the nut 20 onto the bolt 13.

The bolt 13 has a head which is also securely fastened to the circular base 3. Two threaded blind bores holes are provided on diametrically opposite sides of the central hole 12 on the circular base 3. Two through holes 24 are provided in the bolt head. A locking screw 25 is passed through each of the through holes into the threaded bores and tightened to lock the bolt head to the circular base 3.

The above-mentioned conventional coupling bearing is complex in design having ten components: an outer housing, a spherical insert, an outer ball, an inner ball, a seal, bolt, inner sleeve, nut, grub screw and bolt head locking screws.

During any assembly or disassembly of the coupling bearing 1 to/from a carriage or a bogie, access is required to the underside of the tram. Clearly, the requirement to access the coupling from the underside is undesirable especially when there is low ground clearance.

The nut 20 and grub screw 22 together with the locking screws 25 in the design have the potential to work loose or break and, if they do so, then the nut can be detached from the bolt and the bolt can drop through the coupling bearing and down on to the track. Furthermore, the loss of the bolt from the assembly would mean that the carriage and bogie could become readily separated—an occurrence which is preferably avoided in a crash situation.

It is an object of the present invention to provide a thrust bearing which overcomes the disadvantages and problems associated with the bearing design discussed above.

Accordingly, one aspect of the present invention provides a thrust bearing comprising: an outer housing having a substantially circular base, wherein a cylindrical side wall and a central post are upstanding from the base, the central post being integrally formed with the outer housing; an outer ball seated on and at least partially within the outer housing; and an inner ball mounted on the central post, wherein the outer ball is sandwiched between the inner ball and the outer housing.

Preferably, the outer ball has an outer bearing surface and an inner bearing surface and the inner ball has an outer bearing surface, the outer bearing surface of the inner ball and the inner bearing surface of the outer ball abutting one another and the outer bearing surface of the outer ball abutting a bearing surface of the outer housing.

Conveniently, the bearing surface of the outer housing is a bearing surface of a spherical insert of the outer housing.

Advantageously, the spherical insert is a self-lubricating liner.

Alternatively, the spherical insert is a lubricated liner.

Preferably, the outer ball is an annulus having spherical inner and outer bearing surfaces and a central aperture having a chamfered surface.

Conveniently, an outer surface of the central post and the chamfered surface of the outer ball together form an end stop limiting angular displacement of the outer ball with respect to the outer housing.

Advantageously, the chamfered surface of the outer ball and the outer surface of the central post are parallel to one another when in abutment.

Preferably, the inner ball is a truncated hemi-spheroid having two substantially circular and parallel surfaces.

Conveniently, the inner ball has a recess within which to receive a top portion of the post.

Advantageously, the central post terminates in a top portion which is substantially cylindrical.

Preferably, a number of threaded holes are provided in the central post and a corresponding number of bores are provided through the inner ball each to align align with a corresponding threaded hole and a locking screw is fastened in each hole and bore to attach the inner ball to the central post.

Conveniently, the or each locking screw is countersunk into the inner ball.

Advantageously, the central post has a main body which is frusto-conical.

Preferably, the post is integrally formed with the outer housing.

Conveniently, at least one fixture is provided on the outer housing to mount the outer housing to a first element and wherein at least one fixture is provided on the outer ball to mount the outer ball to a second element.

Advantageously, the first element is associated with a carriage of a vehicle and the second element is associated with a bogie of the vehicle.

Preferably, the bearing couples the carriage to the bogie to allow pivotal and rotational movement of the bogie under the carriage.

Another aspect of the present invention provides a method of assembling a thrust bearing comprising the steps of: providing an outer housing having a substantially circular base with a cylindrical side wall and an integrally formed central post upstanding therefrom; seating an outer ball on and at least partially within the outer housing; mounting an inner ball on the central post to sandwich the outer ball between the inner ball and the outer housing; and fixing the inner ball to the central post.

Figure 2:
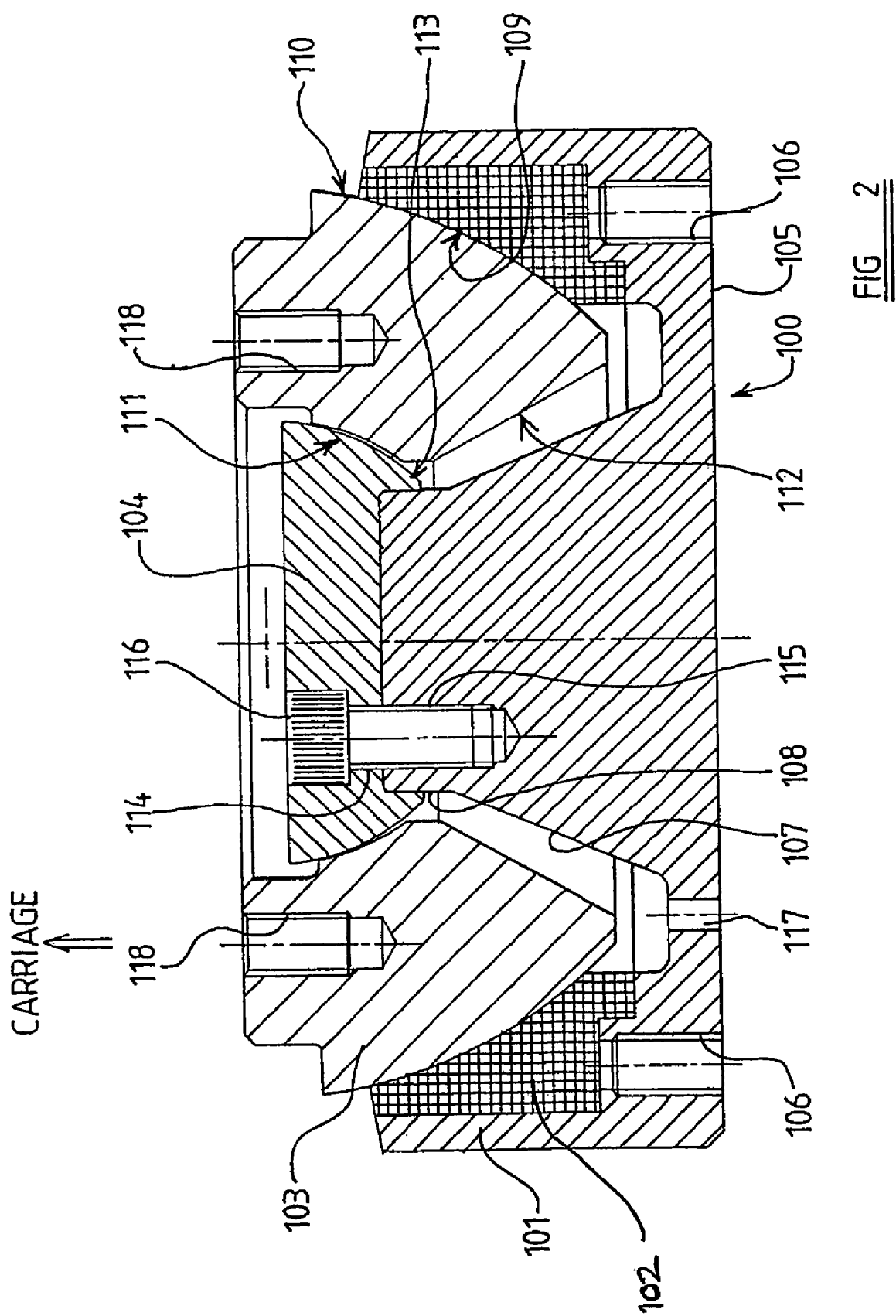

In order that the present invention may be more readily understood, embodiments thereof will now be described, by way of example, with reference to the accompanying drawings, in which:

FIG. 1 is a cross-section through a conventional thrust bearing for use as a coupling bearing between a carriage and a bogie; and FIG. 2 is cross-section through a thrust bearing embodying the present invention.

Referring to FIG. 2, a thrust bearing 100 embodying the present invention comprises an outer housing 101, a spherical insert 102, an outer ball 103 and an inner ball 104 fixed to a portion of the outer housing 101.

Like the outer housing 2 of the conventional design shown in FIG. 1 of the accompanying drawings, the outer housing 101 is substantially cylindrical having a circular base 105. The outer periphery of the circular base 105 is provided with eight equispaced fixing holes 106 with which the outer housing 101 can be fixed to a carriage.

Unlike the outer housing 2 of FIG. 1, the outer housing 101 of the coupling bearing embodying the present invention is not provided with a central hole 12 but instead provides an integrally formed central post 107 which stands upwardly from the circular base 105 projecting into the cylindrical volume defined by the cylindrical side wall of the outer housing 101. The central post 107 is substantially frusto-conical and terminates in a cylindrical portion 108. The central post 107 is of substantially the same height as the cylindrical side wall of the outer housing 101.

The spherical insert 102 is fixedly mounted to an inner surface of the side wall of the outer housing 101 and also to an inner surface of the circular base 105.

The spherical insert 102 has a load bearing surface 109 which is spherical, the spherical insert preferably being manufactured from an engineering plastic such as PETP with PTFE or other lubricating additives. The spherical insert 102 can also be referred to as a lubrication insert or a thermoplastic insert.

The outer ball 103 is an annulus having inner and outer spherical bearing surfaces. The outer ball 103 sits on the spherical shoulders 109 provided by the spherical insert 102. The outer ball 103 has a spherical outer bearing surface 110 and a spherical inner bearing surface 111 and is formed generally as an annular truncated hemi-spheroid. The central aperture of the annulus, preferably has a chamfered surface 112.

The inner ball 104 has a spherical outer bearing surface 113 and is formed generally as a truncated hemispheroid having two flat substantially circular and parallel surfaces. The inner ball 104 has a cylindrical recess in the smaller of the circular surfaces in which a top cylindrical section 108 of the post 107 is located, such that the outer ball 103 is sandwiched between the inner ball 104 and the spherical insert 102 of the outer housing 101.

In the example shown in FIG. 2, five equispaced bores 114 are provided in the inner ball 104 which align which five threaded holes 115 provided in the post 107. Locking screws 116 pass through the bores 114 in the inner ball 104 and are screwed into the threaded holes 115 in the post 107. Preferably, the locking screws 116 are countersunk into the body of the inner ball 104 so that the upper surface of the inner ball 104 has a flush profile.

The outer ball 103 is provided with a series of equispaced holes 118, preferably eight, around its rim for fixing the outer ball 103 to a carriage of a tram or like vehicle.

A clearance gap is provided between the frusto-conical wall of the post 107 and the chamfered surface 112 of the outer ball 103 to allow the outer ball 103 to pitch and roll with respect to the outer housing 101. Preferably, the chamfered surface 112 and the surface of the post 107 are arranged such that when they do come into contact with one another at the full extent of their respective relative movement, the chamfered surface 112 of the outer ball 103 and the surface of the post 107 are parallel to one another so as to contact one another with the greatest amount of common surface area and provide an effective and stop limiting angular movement of the coupling bearing.

It should be noted that after assembly, the outer ball must be free to rotate with respect to the outer housing 101.

A drain hole 117 is provided through the circular base 105 allowing any fluid build-up in the void surrounding the post 107 to drain therethrough. Preferably, the spherical insert 102 is a self-lubricating spherical insert.

By using the design of coupling bearing embodying the present invention to dispense with the bolt 13 and nut 20 of the conventional design shown in FIG. 1, advantages are obtained and problems solved. In particular, because access when assembling or disassembling the coupling is required only to one side of the coupling bearing 100—i.e. to the carriage side containing the locking screws 116, and inner ball 104, the task of assembling or disassembling the coupling no longer requires access to the underside of the bogie thereby reducing assembly times and making assembly generally more convenient. Further, by getting rid of the centre bolt, one also dispenses with the disadvantageous possibility of the centre bolt 13 dropping through the coupling onto the track. Moreover, the possibility of the two halves of the bearing separating is also reduced because the post 107 is integrally formed with the circular base 105 and comprises part of the outer housing 101. Thus, even if all five locking screws 116 were to work loose, the post 107 would still provide a pinion between the two parts of the bearing.

Further, by removing the nut and the bolt from the design, the overall height profile of the bearing is reduced. Not only is the height of the bearing no longer increased by the height of the nut also the height of the bolt head need no longer be taken into account. Thus, a low-profile coupling bearing solution is provided by embodiments of the present invention. Such a low-profile coupling bearing is particularly useful in low floor trams which allow easy access from roads and do not require platforms to be built at stopping stages.

Preferably, as described, the bearing embodying the present invention has a self-lubricating bearing surface. However, it is also possible to use a lubricated bearing surface which can be readily put into effect by providing lubrication grooves and grease holes in the housing and liner of the bearing embodying the present invention in the manner shown in FIG. 1.

In the present specification "comprise" means "includes or consists of" and "comprising" means "including or consisting of".

The invention claimed is:

1. A thrust bearing comprising:
   an outer housing having a substantially circular base, wherein a cylindrical side wall and a central post are upstanding from the base, the central post being integrally fanned with the outer housing to a have a substantially solid center, thereby lacking a central hole extending through the post;
   an outer ball seated on and at least partially within the outer housing; and
   an inner ball mounted on the central post, wherein the outer ball is sandwiched between the inner ball and the outer housing.

2. A thrust bearing according to claim 1, wherein the outer ball has en outer bearing surface and an inner bearing surface and the inner ball has an outer bearing surface, the outer bearing surface of the inner ball and the inner bearing surface of the outer ball abutting one another and the outer bearing surface of the outer ball abutting a bearing surface of the outer housing.

3. A thrust bearing according to claim 2, wherein the bearing surface of the outer housing is a bearing surface of a spherical insert of the outer housing.

4. A thrust bearing according to claim 3, wherein the spherical insert is a self-lubricating liner.

5. A thrust bearing according to claim 3, wherein the spherical insert is a lubricated liner.

6. A thrust bearing according to claim 1, wherein the outer ball is an annulus having spherical inner and outer bearing surfaces and a central aperture having a chamfered surface.

7. A thrust bearing according to claim 6, wherein an outer surface of the central post and the chamfered surface of the outer ball together form an end stop limiting angular displacement of the outer ball with respect to the outer housing.

8. A thrust bearing according to claim 7, wherein the chamfered surface of the outer ball and the outer surface of the central post are parallel to one another when in abutment.

9. A thrust bearing according to claim 1, wherein the inner ball is a truncated hemi-spheroid having two substantially circular and parallel surfaces.

10. A thrust bearing according to claim 1, wherein the inner ball has a recess within which to receive a top portion of the post.

11. A thrust bearing according to claim 1, wherein the central post terminates in a top portion which is substantially cylindrical.

12. A thrust bearing according to claim 1, wherein a number of threaded holes are provided in the central post and a corresponding number of bores are provided through the inner ball each to align with a corresponding threaded hole and a locking screw is fastened in each hole and bore to attach the inner ball to the central post.

13. A thrust bearing according to claim 12, wherein the locking screw is countersunk into the inner ball.

14. A thrust bearing according to claim 1, wherein the central post has a main body which is frusto-conical.

15. A thrust bearing according to claim 1, wherein at least one fixture is provided on the outer housing to mount the outer housing to a first element and wherein at least one fixture is provided on the outer ball to mount the outer ball to a second element.

16. A thrust bearing according to claim 15, wherein the first element is associated with a carriage of a vehicle and the second element is associated with a bogie of the vehicle.

17. A Thrust bearing according to claim 16, wherein the bearing couples the carriage to the bogie to allow pivotal and rotational movement of the bogie under the carriage.

18. A method of assembling a thrust bearing comprising the steps of: providing an outer housing having a substantially circular base wit a cylindrical side wall and an integrally formed central post upstanding therefrom; seating an outer ball on and at least partially within the outer housing; mounting an inner ball on the central post to sandwich the outer ball between the inner ball and the outer housing; and fixing the inner ball to the central post without extending a fastener completely through the central post.

* * * * *